No. 683,408. Patented Sept. 24, 1901.
D. E. KEMPSTER.
ANTIFRICTION BEARING.
(Application filed May 10, 1900.)
(No Model.) 2 Sheets—Sheet 1.
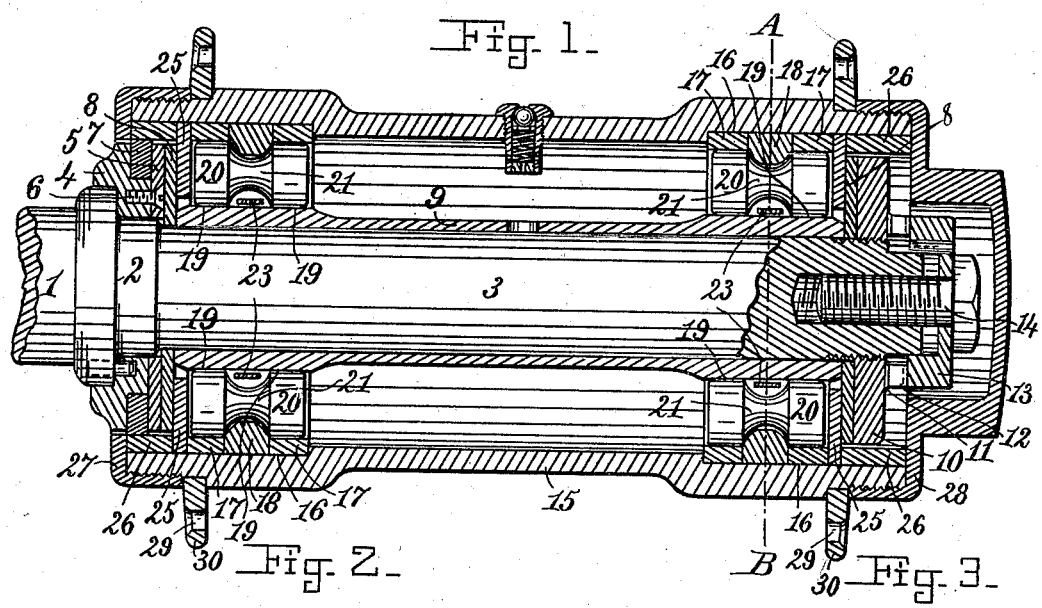
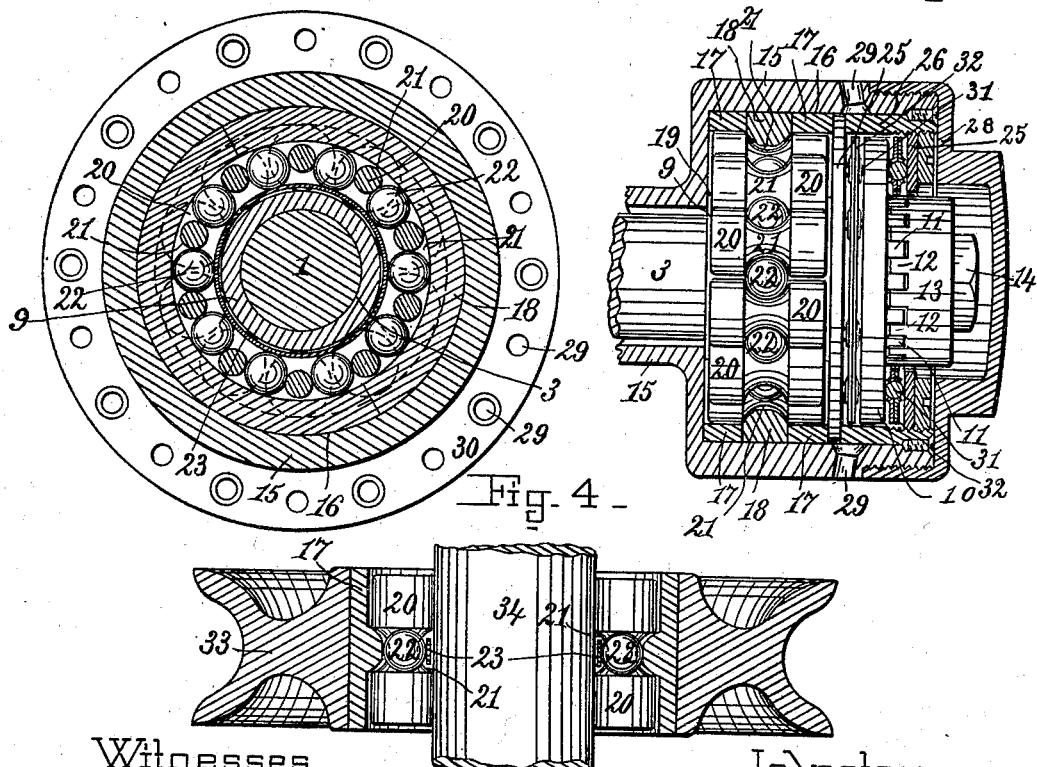
Witnesses
Arthur C. Jones
May F. Fuller
Inventor
Daniel E. Kempster
by
Henry Chadbourn
his atty.

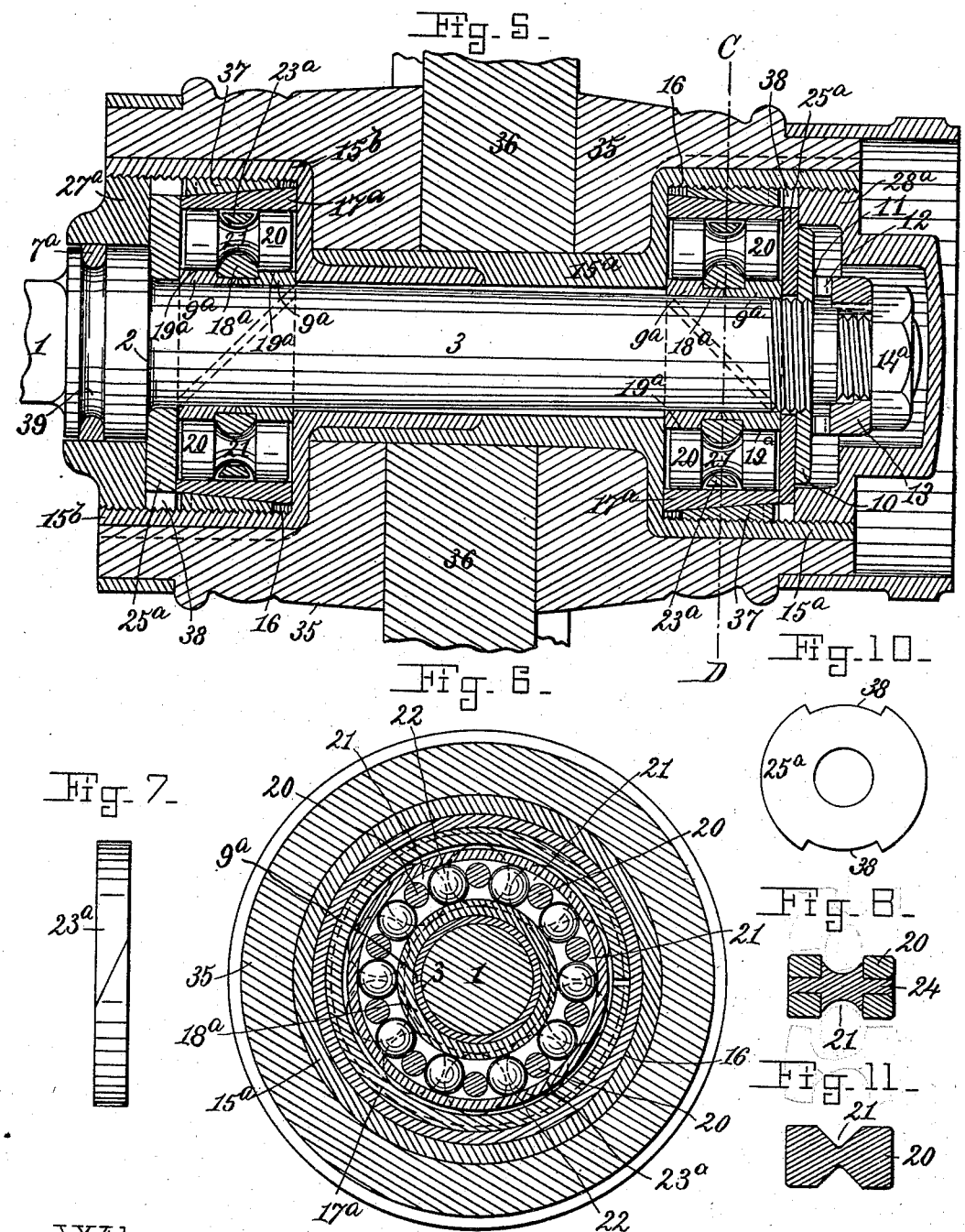
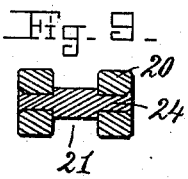

UNITED STATES PATENT OFFICE.

DANIEL E. KEMPSTER, OF BOSTON, MASSACHUSETTS.

ANTIFRICTION-BEARING.

SPECIFICATION forming part of Letters Patent No. 683,408, dated September 24, 1901.

Application filed May 10, 1900. Serial No. 16,222. (No model.)

*To all whom it may concern:*

Be it known that I, DANIEL E. KEMPSTER, of Boston, in the county of Suffolk and State of Massachusetts, have invented certain new and useful Improvements in Antifriction Journal-Bearings, of which the following is a specification.

This invention relates to improvements in antifriction journal-bearings for general use, such as in wheels, sheaves, bearings for shafting, and other places where it is desirable to lessen the friction between two members, one or both of which have motion.

The invention relates more especially to improvements in the journal-bearing for which United States Letters Patent numbered 585,580 were issued to me June 29, 1897, and it relates more particularly to improvements whereby the bearing is applicable to the hubs of wheels for vehicles.

The invention consists in the novel constructions, arrangements, and combinations of parts, as fully described hereinafter and set forth in the claims hereunto annexed.

The invention is carried out substantially as illustrated on the accompanying drawings, forming an essential part of this specification, and whereon—

Figure 1 represents a central longitudinal section of the hub of a wheel made in accordance with my invention. Fig. 2 represents a cross-section of the hub on the line A B, shown in Fig. 1. Fig. 3 represents a side elevation of one end of the hub shown in Fig. 1 and showing the outer casing of the hub in longitudinal section and also showing slightly-modified forms of the internal mechanism as well as the external casing. Fig. 4 represents a longitudinal section of a sheave-wheel made in accordance with my invention. Fig. 5 represents a central longitudinal section of my improved bearing as applied to the wooden hub of a vehicle-wheel. Fig. 6 represents a cross-section of the same on the line C D, shown in Fig. 5. Figs. 7, 8, 9, 10, and 11 represent detail views of various parts of the bearing and modified forms of the same.

Like characters of reference refer to like parts wherever they occur on the different parts of the drawings.

Referring to my invention as illustrated in Figs. 1, 2, 3, and 4, the axle of the vehicle is provided with the shoulder 2, and between this shoulder and the end of the axle is the cylindrical portion 3, which carries the hub of the wheel. Upon this cylindrical portion is placed a collar, preferably made in two parts 4 and 5, secured together by one or more screws 6 or by other means and clamping a suitable felt or other flexible washer 7 upon its periphery, substantially as shown, and which collar is preferably splined or pinned in any suitable manner to the axle to prevent it from rotating thereon. An antifriction-washer 8, preferably of rawhide, fiberoid, or other wear-resisting material, is placed upon the axle so as to rest against said collar. A tubular sleeve 9 is placed upon the axle so as to rest against the face of the washer 8 and to extend nearly to the outer end of the axle. A second washer 8, of rawhide, fiberoid, or other wear-resisting material, is placed upon the axle in such a position that its inner surface rests against the outer end of the sleeve 9. The sleeve 9 and washers 8 are held upon the shaft so they will be free to turn upon said shaft when necessary by means of a screw-threaded collar 10, screwed upon the screw-thread near the outer end of the axle, substantially as shown. This screw-threaded collar is provided on its outer face with the crown gear-teeth 11, which mesh into the crown gear-teeth 12 upon a cup-washer 13, or said parts may be provided with any other equivalent and well-known means for locking them together. The cup-washer is splined upon the cylindrical reduced outer end of the axle so as to be movable longitudinally upon the axle, but is prevented from rotary motion thereon by being splined to said axle, and as the gear-teeth on the cup-washer mesh into the gear-teeth on the screw-threaded collar it will be seen that the spline on the cup-washer will prevent the rotation of the screw-threaded collar. In order to retain the teeth of the cup-washer in gear with the teeth on the screw-threaded collar, I provide the outer end of the axle with a screw 14, which screw passes through a perforation in the cup-washer and has its head resting against the outer surface of the same. It will thus be seen that by means of the cup-washer, with its gear-teeth, which washer is splined upon the axle and held firmly thereon by means of the screw 14, in combination with the gear-teeth upon the screw-threaded collar, I am able to lock the screw-threaded collar from turning upon the axle at any of the adjusted positions to which the screw-threaded collar may be adjusted, and by this means I am able to take up any wearing of the parts of the bearing occasioned by the end thrust.

The casing of the bearing when forming the hub of the wheel to be used upon a vehicle and as shown in Figs. 1, 2, and 3 consists of an outer tubular casing 15, counterbored at both ends, substantially as shown and for a purpose to be described hereinafter. Within the counterbored portions 16, at the outer ends of the outer casing, are placed two circular bushings 17 17, with a circular bushing 18, of lesser inner diameter than the inner diameter of the bushings 17, introduced between said bushings 17, thus forming two internal circular tracks, with an annular internally-projecting rib between them at each end of the outer casing. Around tracks 19 19, on the sleeve 9, is arranged a series of rolls 20 20, which are of such a diameter that they bear upon the surfaces and upon the tracks on the bushings 17. The number of rolls used is preferably such that their surfaces will not come into contact with the next rolls in the series when they are arranged in position around the sleeve 9, as shown in dotted lines in Fig. 2. Each of these rolls is provided about midway between its ends with a groove 21, which is preferably about semicircular, as shown. Between each two rolls 20 of the series and within the grooves 21 therein is placed a ball 22. Therefore there is a series of rolls 20 with a series of balls 22 arranged alternately around the tracks 19 of the sleeve 9. These balls are of such a diameter that their surfaces preferably bear against the lowest part of the grooves 21 in the rolls and act as separators to prevent the surfaces of the rolls from contacting with the next roll on either side in the series of rolls and also of such a diameter that they will roll upon the inner surface of the rib projecting between the tracks of the bushings 17. The grooves 21 in the rolls, the size of the balls 22, and the internal diameter of the rib-bushing 18 are preferably of such a relation to each other that the centers of the balls will be substantially in a plane passing through the centers of the rolls, within the grooves of which the balls are located. The balls are held in place outward against the track on the bushing 18 by means of an inner track, upon which they roll when in motion, and this inner track has been shown as being the outer surface of a circular ring 23, which surrounds the track 19, but does not come into contact with the track 19. This ring 23 is arranged to enter the grooves 21 on the rolls, which grooves prevent it from moving lengthwise of the axle and from under the balls. In a like manner the rib formed by the stationary bushing 18 enters the grooves 21 in the series of rolls and prevents any lengthwise movement of the rolls in either direction.

In order to assemble the rolls 20, balls 22, bushing 18, and ring 23 into the positions shown in Figs. 1 and 2, I may split the ring 23 and form it from some springy material, as described in my above-mentioned patent, or I may form the bushing 18 in halves, as shown in Fig. 2, and leave the inner ring whole and continuous. This latter construction in some respects is the preferable construction, as there is no possible way in which the balls could become displaced when once in position, as they will be confined on all sides by solid retaining members. If so desired, the above parts could be assembled by having both the bushing 18 and ring 23 made whole and constructing the rolls 20 from two or more parts held together by a suitable rivet or shank portion 24, as shown in Figs. 8 and 9, in which construction the parts of the roll having the surfaces which engage the tracks on the bushings 17 and the sleeve 9 may be made of extremely-hardened steel, while the surface of the groove upon which the balls travel and which is not so liable to wear, as the balls support no weight, may be made of less-hardened steel or other suitable material, which will lessen the liability of the rolls breaking across their shank or lower portion of their groove. If a roll is used which is made up from sections, as shown in Figs. 8 and 9, the groove may be made semicircular, as shown in Fig. 8, or it may be made rectangular, as shown in Fig. 9, or V-shaped, as shown in Fig. 11, as desired. After the bushings 17 and 18, the rolls 20, balls 22, and the ring 23 have been assembled within the ends of the outer casing 15, as shown, the outer casing, with said parts contained therein, may be withdrawn from the axle and replaced thereon without danger of the balls or rolls becoming displaced.

To prevent lengthwise movement on the axle by the outer casing and the above-named parts contained therein, I place a metal disk or washer 25 within the counterbored portions 16 of the outer casing, one at either end of the casing and so that their inner surfaces rest against the outer surfaces of the outer bushings 17, which bushings prevent said washers from being forced sufficiently into the casing to cause them to contact with the ends of the rolls. These washers 25 I term "end-thrust" washers, as they have their outer surfaces resting against the inner surfaces of the fiberoid or other antifriction washers 8, and consequently support the casing against any end motion, which would tend to move the hub lengthwise of the axle. It will be understood that the fiberoid washers 8 may be adjusted upon the axles by the screw-threaded collar 10, the cup-washer 13, and bolt 14, as above described, and so that there will be an easy-running contact between the end-thrust washers 25 and the fiberoid washers 8 without creating friction between said parts. The washers 25 are held in place within the counterbore 16 by means of the bushings 26 within said counterbore and held therein at the inner end of the hub by means of a screw-threaded ring-cap 27, screwed upon the screw-threaded end of the casing 15, while at the outer end of the hub said end-thrust washer and bushing are held in place by means of a protecting-cap 28, screwed upon the outer screw-threaded end of the casing.

When the wheel having my improved bearing applied to its hub is to have wire spokes similar to a bicycle-wheel, said spokes may be inserted through perforations 29 in flanges 30 on the hub, in which case the flanges may be forced upon the opposite ends of the casing 15, resting against shoulders formed thereon, and be held in place by the ring-cap 27 and protecting-cap 28, as shown in Figs. 1 and 2, or said perforations 29 may be formed through the outer casing 15 and the spokes be inserted therein from the inside of the casing, so that their heads will rest within suitable countersunk portions of said perforations and hold said spokes, their heads being covered by means of the bushings placed within the counterbored portion of the outer casing and substantially as shown in Fig. 3.

From the above description of my invention it will be seen that there are no surfaces which engage either the rolls or the balls but what move or are free to move in the same direction as the movement of the surface of the balls or rolls touched thereby, and consequently there can be no rubbing friction upon the rolls or balls; that the sleeve 9, being loosely held upon the axle between the fiberoid washers 8, can rotate upon the axle when there is any tendency for it to rotate thereon, and consequently the rolls can never become cramped and held between the outer tracks and the inner tracks on the sleeve, as the sleeve would itself rotate slightly upon the axle until this tendency is removed; that when my invention is used in the hub of a vehicle, as shown in Figs. 1, 2, 3, 5, and 6, or in a similar place where it is liable to be subjected to an end thrust tending to cause the casing of the bearing to move endwise upon its journal this endwise movement of the casing is prevented by the introduction of end-thrust washers within the casing and collars upon the axle or other journal, and all friction between said washers and collars is prevented by the introduction of suitable antifriction-washers therein; that the rolls and balls are retained in their places when the hub is removed from the axle, and therefore do not have to be adjusted when replacing the hub in position upon the axle; that the interior of the hub is thoroughly protected against the admission of dust or dirt thereto by the felt or other packing in the collar on the axle and the protecting-cap on the outer end of the casing; that any of the bushings or sleeves liable to become worn by continued use may be easily and quickly replaced by others at a slight cost and without discarding the entire casing or other parts of the hub, and also that either a ball or a roll may be easily placed in position to take the place of one injured or worn out.

In Fig. 3 I have shown ball-bearing washers substituted for the fiberoid washers 8, which ball-bearing washers are composed of a series of balls 31, arranged around the axle and held in place by means of two disks or plates 32, clamped together in some suitable manner, having perforations to retain the balls and through which they project on either side of the washer to rest against the metal washers 25 and the screw-threaded collar 10, or said washers may be made in any suitable manner, preventing friction which would otherwise be produced. I have shown the end-thrust washers as applied to one end of the bearing only, one being on either side of the collar 10, with interposed ball-bearing washers between said parts. I have also illustrated the axle as being provided with two short sleeves 9, each of sufficient length to form the tracks 19 for the rolls 20; but I have illustrated in said Fig. 3 only the outer end of the hub of a wheel and but one of the short sleeves 9, mounted upon the axle carrying said hub. These sleeves 9 9 are prevented from moving lengthwise of the axle from under the rolls toward the center of the bearing by reducing the inner diameter of the central part of the outer casing 15, thereby forming shoulders against which these sleeves bear, substantially as illustrated.

In Fig. 4 I have illustrated my bearing as applied to a sheave of a pulley-block and have shown the bushings 17, forming the outer tracks upon which the rolls travel, as well as the bushing forming the rib having a track upon which the balls bear, as being made in one piece and forced or otherwise secured within the body of the sheave 33, the pin or journal 34 itself forming the inner tracks for the rolls.

Thus far I have described my invention as applied to an entirely metal hub for a vehicle where wire spokes are used and to a pulley-sheave; but my invention is equally applicable to a wooded hub with which wooden spokes are used. I have also shown adjusting means to take up wear in the end-thrust washers and fiberoid or other antifriction washers or other part or parts which would cause a lengthwise movement of the hub upon the axle; but means of adjustment may be employed to take up wear on the rolls, balls, and tracks upon which they travel, which wear would cause a looseness of the hub upon the axle and rattling of the rolls and balls.

In Figs. 5 and 6 I have illustrated my invention as applied to a wooden hub for a vehicle-wheel and have also shown means whereby the parts liable to wear and produce a looseness of the hub upon the axle or rattling of parts may be adjusted to take up this wear. In the construction shown in Figs. 5 and 6 the outer casing is made in two sections 15ª and 15ᵇ, which sections are telescoped together in a suitable manner, being driven into the wooden body 35 of the hub from opposite ends of the same. If so desired, these sections may be held within the wooden hub by having their telescoping portions screw-threaded and screwed one within the other. The center part of the casing is contracted in diameter, so as to nearly engage the surface of the axle in order to leave as much of the wooden hub 35 as possible to receive the inner ends of the spokes 36 of the wheel and also to form means to resist the end thrust of the hub upon the axle, as described hereinafter. The inner tracks 19ª for the rolls 20 are formed upon two sleeves 9ª, placed upon the portion 3 of the axle at each end thereon, and so that the series of rolls may run thereon. They are preferably free to rotate upon said axle when necessary to relieve cramping of the rolls or other parts which would tend to rotate them. The sleeves 9ª are so shaped that when in place upon the axle they form an annular groove at the abutting edges of the sleeves, in which groove and around said sleeve 9ª is placed a collar 18ª, forming a projecting rib, which enters the grooves 21 of the series of rolls 20 and prevents endwise movements of the rolls. A loose ring 23ª surrounds the series of rolls, it resting within the grooves on the rolls. The collar 18ª and ring 23ª form, respectively, an inner and outer track, which together retain the series of separating-balls in their proper places between the rolls. When the collar 18ª and the ring 23ª are both made whole and continuous, it is necessary that a sectional roll similar to those shown in Figs. 8 and 9 should be used in order to be able to assemble the rolls, balls, collar, and ring; but when said parts are assembled they will be held in their relative positions and may be sold in that condition to be inserted in hubs for repair purposes when required. The outer tracks for the rolls are formed upon the inner surface of a ring or bushing 17ª, placed within the casing, as shown, which bushing is preferably split substantially as shown in dotted lines in Fig. 5, for the purpose of adjustment of said bushing to compensate for wearing of the rolls and the tracks upon which they travel. This bushing 17ª is made tapering upon its outer surface, and between said bushing and the inner screw-threaded surface of the ends of the casing is placed a second bushing 37, which is screw-threaded upon its exterior to fit the screw-thread in the casing and is tapered on its interior to correspond with the taper on the bushing 17ª, the bushing 37 being adjustable within the screw-threaded end of the casing to force its tapered portion upon the tapered portion of the bushing 17ª, and thereby to contract the diameter of the split bushing 17ª more or less to compensate for wearing of the parts.

An end-thrust washer 25ª is screwed into the screw-threaded end of the casing, one at each end thereof, which washers rest against the outer ends of the split bushings 17ª. The washers 25ª are locked in their proper positions in the casing by means of the ring-cap 27ª, screwed into one end of the casing, and the protecting-cap 28ª, screwed into the other end of the casing. The washer 25ª on the inner end of the hub engages the shoulder 2 on the axle to prevent the longitudinal movement of the hub in one direction, while the washer 25ª at the opposite end of the hub engages the screw-threaded collar 10 in the axle to prevent a longitudinal movement. The washers 25ª are provided on their outer edges with cut-away portions 38, substantially as shown in Fig. 10, so as to allow the insertions of a suitable wrench or other instrument into teeth or recesses on the adjusting-bushing 37 to adjust said bushing. The collar 10 is locked in its adjusted position upon the axle by means of the cup-washer 13 in a similar manner to that shown and described in relation to Figs. 1 and 3; but in Fig. 5 the teeth on the cup-washer have been shown as being held in contact with the teeth on the collar 10 by means of a nut 14ª, screwed upon the screw-threaded end of the axle outside of said cup-washer. It will be seen that all dust or dirt is excluded from the moving parts in the outer end of the hub by means of the protecting-cap 28ª and that the only place at the inner end of the hub where dust or dirt would be liable to enter the casing and the moving parts contained therein is through the joint between the axle and the ring-cap 27ª; but in order to exclude dust or dirt from this joint I provide the collar which forms the shoulder 2 of the axle with a groove 39 of any desired shape and place a ring 7ª, of felt or other flexible dust-excluding material, within said groove in such a manner that it rests against the inner surface of the ring-cap, substantially as shown, or it may be placed within a groove on the inner surface of the ring-cap, if so desired.

By forming the tracks for the rolls as well as those for the balls by means of bushings, rings, and collars placed within counterbored portions of the casing and upon the axle, substantially as shown and described, I am able to easily and quickly remove any or all of said parts when worn out or otherwise injured and can replace them by others at a slight cost and without discarding the entire casing or the axle. It will also be seen that by forming the tracks for the rolls and the intervening rib, which forms a track for the balls, on separate and independent bushings or collars I am able to harden them and then grind each surface true independent of the others, thus forming a roller-bearing which is capable of a very fine adjustment of its running parts and one which will run very true and even without rattle or looseness between its parts.

It will be understood without further illustration or description and by any one skilled in the art to which this invention relates that I may apply the lateral adjusting mechanism for taking up the wear on the rolls and their tracks to the inner sleeve, which forms the inner tracks for the rolls instead of applying it to the bushing forming the outer tracks and that the various modified forms or arrangement of the parts may be combined in various ways by the exercise of mechanical skill only and without departing from the spirit of my invention.

Having thus fully described the nature, construction, and operation of my invention, I wish to secure by Letters Patent and claim—

1. A casing, a series of annularly-grooved load-sustaining rolls therein, ball-separators entering the grooves in the rolls and alternating with the rolls to separate each roll from the next roll in the series, a ring forming an inner track for the ball-separators, entering the grooves in the rolls and preventing the separators from moving inward, and an annular rib carried by the casing, forming an outer track for the ball-separators, preventing them from moving outward, entering the grooves in the rolls and preventing endwise movement of the rolls in relation to the casing, for the purpose set forth.

2. A casing, a series of annularly-grooved load-sustaining rolls, separators entering the grooves in the rolls alternating with the rolls to separate each roll from the next roll in the series, removable bushings placed within the casings forming outer tracks for the rolls which may be easily removed when desired and an intermediate removable bushing inserted with the other bushings forming an internal projecting retaining-rib entering the grooves in the rolls to prevent endwise displacement of the rolls and forming an outer track for the separators, for the purpose set forth.

3. A casing, a series of annularly-grooved rolls at each end of the casing, tracks for the rolls within the casing, separators at each end of the casing entering the grooves in the rolls alternating with the roll to separate each roll from the next roll of the series, a retaining-rib projecting inwardly from the interior of the casing entering the grooves in a series of rolls to prevent endwise displacement of the rolls in relation to the casing, and end-thrust washers secured to the interior of the casing and projecting inwardly therefrom to prevent endwise moving of the casing in relation to a journal upon which the rolls travel, for the purpose set forth.

4. A journal, a casing, a series of annularly-grooved rolls at each end of the casing, tracks for the rolls upon the interior of the casing, separators entering the grooves in the rolls alternating with the rolls to separate each roll from the next roll in the series, an annular inwardly-projecting rib on the interior and at each end of the casing entering the grooves in the rolls to prevent endwise displacement of the rolls in relation to the casing, end-thrust washers secured to the interior of the casing and projecting inwardly therefrom to prevent endwise movement of the casing in relation to the journal, and means to adjust the end-thrust washers to take up wear, for the purpose set forth.

5. A journal, a casing, an antifriction-bearing contained therein, end-thrust washers within the casing to prevent endwise movement of the casing upon the journal, and means to adjust the end-thrust washers to take up wear, consisting of a collar on the journal, a second collar screwed upon the journal having locking projections, a cup-washer splined upon the journal also having locking projections interlocking with the projections on said collar, and means to hold the said projections in engagement with each other, for the purpose set forth.

6. In an antifriction-bearing, annularly-grooved rolls, an outer tubular casing counterbored at its ends, removable bushings placed within the counterbored portion forming tracks for the rolls and projecting ribs to enter the grooves in the rolls, the rib-forming bushing held in place by the track-forming bushings and the rib-forming bushing holding the rolls from longitudinal movement and means to retain said bushings within said counterbored portion of the casing, for the purpose set forth.

7. In an antifriction-bearing, an outer casing, series of rolls, separators therefor, combined with tracks for the rolls and separators formed by a plurality of introduced bushings of uniform outer diameters and of proper inner diameters to hold the rolls and separators in proper relation to each other, and means for securing said bushings in place within the casing, for the purpose set forth.

8. In a roller-bearing, a series of rolls provided midway their ends with an annular groove, a series of ball-separators one between each two of the rolls, entering the grooves in the rolls, an inner and an outer track for the separators also entering the grooves in the rolls and holding said separators in such positions relative to the rolls that they separate that a plane passing longitudinally through the axes of the rolls will also pass through the center of rotation of the separator which is between said rolls, for the purpose set forth.

9. In a roller-bearing, a casing, series of load-sustaining annularly-grooved rolls therein, tracks for said rolls within said casing, washers forming cylindrical chambers at the ends of the casing within which the rolls are located, internally-projecting ribs in the casing entering the grooves in the rolls to hold said rolls in position in relation to said casing, a shaft or journal, tracks for the rolls carried by the shaft or journal, collars on said shaft or journal, and antifriction-washers between said collars and the washer on the casing, for the purpose set forth.

10. In a roller-bearing, a casing, series of load-sustaining annularly-grooved rolls therein, tracks for the rolls within said casing, washers within the ends of said casing forming cylindrical chambers at the ends of the casing within which the rolls are located, internally-projecting ribs within the casing entering the grooves in the rolls to hold them in proper position in relation to the casing, a shaft or journal, tracks for the rolls carried by said shaft or journal, collars on the shaft or journal, antifriction-washers between said collars and the washers on the casing, means to adjust the tracks upon the shaft or journal, and means to adjust the antifriction-washers, for the purpose set forth.

In testimony whereof I have affixed my signature in presence of two witnesses.

DANIEL E. KEMPSTER.

Witnesses:
WILLIAM H. HOWES,
MAY F. FULLER.